US011072712B2

(12) United States Patent
Kramer et al.

(10) Patent No.: US 11,072,712 B2
(45) Date of Patent: Jul. 27, 2021

(54) CORROSION RESISTANT SOL-GEL COATING AND COMPOSITION AND PROCESS FOR MAKING THE SAME

(71) Applicant: HENKEL AG & CO. KGaA, Duesseldorf (DE)

(72) Inventors: Kirk Kramer, West Bloomfield, MI (US); Lisa K. Miller, Clinton Township, MI (US); Shawn E. Dolan, Sterling Heights, MI (US); Patrick A. Scalera, Canton, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 380 days.

(21) Appl. No.: 13/705,576

(22) Filed: Dec. 5, 2012

(65) Prior Publication Data

US 2013/0095317 A1    Apr. 18, 2013

Related U.S. Application Data

(63) Continuation of application No. PCT/US2011/039539, filed on Jun. 8, 2011.

(51) Int. Cl.
| | | |
|---|---|---|
| *C09D 5/08* | (2006.01) | |
| *B32B 33/00* | (2006.01) | |
| *B32B 15/04* | (2006.01) | |
| *C23C 18/12* | (2006.01) | |
| *C23C 22/56* | (2006.01) | |
| *C09D 1/00* | (2006.01) | |
| *C23C 22/83* | (2006.01) | |

(52) U.S. Cl.
CPC ............... *C09D 5/08* (2013.01); *B32B 15/04* (2013.01); *B32B 33/00* (2013.01); *C09D 1/00* (2013.01); *C09D 5/084* (2013.01); *C23C 18/1295* (2013.01); *C23C 22/56* (2013.01); *C23C 22/83* (2013.01); *C23C 2222/20* (2013.01); *Y02T 50/60* (2013.01); *Y10T 428/265* (2015.01); *Y10T 428/31663* (2015.04)

(58) Field of Classification Search
CPC ...................................................... C09D 5/08
USPC ..................................................... 427/376.2
See application file for complete search history.

(56) References Cited

U.S. PATENT DOCUMENTS

| | | | |
|---|---|---|---|
| 5,004,562 A | | 4/1991 | Kissel |
| 5,028,489 A | * | 7/1991 | Kissel ........................... 428/469 |
| 5,206,285 A | | 4/1993 | Castellucci |
| 5,298,092 A | | 3/1994 | Schriever |
| 5,789,085 A | | 8/1998 | Blohowiak et al. |
| 5,814,137 A | | 9/1998 | Blohowiak et al. |
| 5,849,110 A | | 12/1998 | Blohowiak et al. |
| 5,866,652 A | | 2/1999 | Hage et al. |
| 5,869,140 A | | 2/1999 | Blohowiak et al. |
| 5,869,141 A | | 2/1999 | Blohowiak et al. |
| 5,939,197 A | | 8/1999 | Blohowiak et al. |
| 5,958,578 A | | 9/1999 | Blohowiak et al. |
| 6,037,060 A | | 3/2000 | Blohowiak et al. |
| 6,077,885 A | | 6/2000 | Hager et al. |
| 6,197,101 B1 | * | 3/2001 | Matsumura .......... C09D 183/02 106/287.11 |
| 6,605,365 B1 | | 8/2003 | Krienke et al. |
| 6,770,371 B2 | | 8/2004 | Stephenson et al. |
| 7,001,666 B2 | | 2/2006 | Krienke et al. |
| 8,147,918 B2 | | 4/2012 | Standke et al. |
| 2003/0024432 A1 | * | 2/2003 | Chung et al. .............. 106/14.12 |
| 2004/0081767 A1 | | 4/2004 | Pfaendtner et al. |
| 2004/0099183 A1 | | 5/2004 | Wire et al. |
| 2009/0148711 A1 | * | 6/2009 | Le Blanc et al. ............ 428/447 |
| 2009/0192251 A1 | | 7/2009 | Chung |
| 2009/0239061 A1 | * | 9/2009 | Hazel .................. C23C 18/1208 428/332 |
| 2010/0273013 A1 | | 10/2010 | Jin et al. |
| 2012/0095317 A1 | | 4/2012 | Strickland et al. |
| 2012/0101181 A1 | | 4/2012 | Munshi et al. |
| 2013/0035413 A1 | | 2/2013 | Obi et al. |
| 2013/0095317 A1 | | 4/2013 | Kramer et al. |
| 2014/0272155 A1 | | 9/2014 | Kramer et al. |

FOREIGN PATENT DOCUMENTS

| | | |
|---|---|---|
| CN | 101007901 A | 8/2007 |
| CN | 101184866 A | 5/2008 |
| EP | 1780313 A2 | 5/2007 |
| WO | 00/74451 A1 | 12/2000 |
| WO | 2010121872 A1 | 10/2010 |
| WO | 2011156438 A1 | 12/2011 |

OTHER PUBLICATIONS

US 8,772,432 B2, 07/2014, Albert et al. (withdrawn)
Young, Overview of Sol-Gel Science and Technology, Army Research Laboratory, Jan. 2002, p. 1-14.*
International Search Report for PCT/US2011/039539, dated Oct. 14, 2012.
Chinese Office Action dated May 6, 2014, Application No. 201180033850.6, 10 Pages.
International Search Report, PCT/IB2014/001103, dated Nov. 19, 2014, 4 pages.
Written Opinion of the International Searching Authority, PCT/IB2014/001103, dated Nov. 19, 2014, 8 pages.

* cited by examiner

*Primary Examiner* — Tabatha L Penny
(74) *Attorney, Agent, or Firm* — Mary K. Cameron

(57) ABSTRACT

A coating composition and a method is used to coat metallic substrates for corrosion resistance. The coating composition includes acid, metal acetate, organosilane and water. The method includes steps of depositing the composition on an aluminum or aluminum alloy substrate and allowing the composition to dry to form a sol-gel coating on the substrate.

21 Claims, No Drawings

CORROSION RESISTANT SOL-GEL COATING AND COMPOSITION AND PROCESS FOR MAKING THE SAME

This application is a continuation of international application number PCT/US2011/039539, filed Jun. 8, 2011, which claims priority to U.S. Provisional Application No. 61/352,541, filed Jun. 8, 2010, each of which are incorporated herein by reference in their entirety.

BACKGROUND OF THE INVENTION

1. Field of the Invention

In at least one embodiment, the present invention relates to a sol-gel surface coating that imparts corrosion resistance. In other embodiments, the present invention relates to a sol-gel coating composition and process for making and using the sol-gel coating composition.

2. Background Art

Sol-gel coatings have been used as conversion coatings for aluminum and other metal substrates such as ferrous and zinc substrates. One particular use of sol-gel coatings has been in the aerospace industry. For instance, sol-gel coatings have been applied to substrates particular to that industry, such as aluminum and titanium alloys, as an adhesion promoter between the underlying substrate and a paint primer, such as an epoxy primer. In addition to being an adhesion promoter, sol-gel coatings can provide good corrosion resistance, particularly on aluminum substrates, when the coating is baked.

Typical sol-gel bake systems are 100° Celsius to 250° Celsius. However, when sol-gel coatings are used on aircraft, typical sol-gel coatings are not particularly suitable since it is not considered advantageous to expose aircraft substrates to temperatures necessary to achieve baking. The same sol-gel coatings that have good corrosion resistance at the high bake temperatures tend not to perform well when cured in ambient conditions, such as at room temperature, which is the preferred temperature for curing a composition used on the exterior of an aircraft.

Accordingly, it would be advantageous to provide a sol-gel coating that can have favorable corrosion resistance when cured at temperatures less than 100° Celsius and, preferably around room temperature. Moreover, it would also be desirable if such a coating had good corrosion resistance performance at elevated cured temperatures.

SUMMARY OF THE INVENTION

It has been found that certain aqueous sol-gel compositions containing acid, metal acetate, and organosilane provide sol-gel coatings that can have favorable corrosion resistance when cured at temperatures less than 100° Celsius, such as room temperature.

In at least one embodiment, the present invention comprises a sol-gel composition comprising acid, metal acetate, organosilane, water and optionally a surfactant. In this embodiment, the sol-gel composition comprises 1.75-8.0 weight percent acid, 1.5-8.0 weight percent metal acetate, 10-50 weight percent organosilane, 35-90 weight percent water, and 0-1 weight percent surfactant. In another embodiment, the sol-gel composition comprises 2-4.0 weight percent acid, 1.75-4.0 weight percent metal acetate, 10-25 weight percent organosilane, 65-88 weight percent water, and 0-0.25 weight percent surfactant. Unless stated to the contrary, these and other weight percents are based on actives.

In a preferred embodiment, the present invention comprises a sol-gel composition comprising glacial acetic acid, metal acetate, glycidoxypropyl trimethoxy silane, water and optionally a surfactant. In this embodiment, the metal acetate can be either zirconium acetate, magnesium acetate, or a combination thereof. In this embodiment, the sol-gel composition comprises 1.75-8.0 weight percent glacial acetic acid, 1.5-8.0 weight percent metal acetate, 10-50 weight percent of an epoxy silane, such as glycidoxypropyl trimethoxy silane, 35-90 weight percent water, and 0-1 weight percent surfactant. In another embodiment, the sol-gel composition comprises 2-4.0 weight percent glacial acetic acid, 1.75-4.0 weight percent metal acetate, 10-25 weight percent of an epoxy silane, 65-88 weight percent water, and 0-0.25 weight percent surfactant.

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
|---|---|
| Acid | 1.75 to 8.0 |
| Metal Acetate (solids) | 1.5 to 8.0 |
| Organosilane | 10 to 50.0 |
| Water | 35 to 90 |
| Surfactant | 0 to 1 |

In accordance with various other embodiments of the invention is an aqueous composition for coating metal substrates, wherein the aqueous composition comprises, preferably consists essentially of, and more preferably consists of:

| Component | Weight Percent |
|---|---|
| Acid | 2.0 to 4.0 |
| Metal Acetate (solids) | 1.75 to 4.0 |
| Organosilane | 10 to 25.0 |
| Water | 65 to 88 |
| Surfactant | 0 to 0.25 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
|---|---|
| Glacial Acetic Acid | 1.75 to 8.0 |
| Zirconium Acetate (solids) | 1.5 to 8.0 |
| Glycidoxypropyl Trimethoxy Silane | 10 to 50.0 |
| Water | 35 to 90 |
| Surfactant | 0 to 1 |

In accordance with various other embodiments of the invention is an aqueous composition for coating metal substrates, wherein the aqueous composition comprises, preferably consists essentially of, and more preferably consists of:

| Component | Weight Percent |
|---|---|
| Glacial Acetic Acid | 2.0 to 4.0 |
| Zirconium Acetate (solids) | 1.75 to 4.0 |

-continued

| Component | Weight Percent |
| --- | --- |
| Glycidoxypropyl Trimethoxy Silane | 10 to 25.0 |
| Water | 65 to 88 |
| Surfactant | 0 to 0.25 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Glacial Acetic Acid | 1.75 to 8.0 |
| Magnesium Acetate (solids) | 1.5 to 8.0 |
| Glycidoxypropyl Trimethoxy Silane | 10 to 50.0 |
| Water | 35 to 90 |
| Surfactant | 0 to 1 |

In accordance with various other embodiments of the invention is an aqueous composition for coating metal substrates, wherein the aqueous composition comprises, preferably consists essentially of, and more preferably consists of:

| Component | Weight Percent |
| --- | --- |
| Glacial Acetic Acid | 2.0 to 4.0 |
| Magnesium Acetate (solids) | 1.75 to 4.0 |
| Glycidoxypropyl Trimethoxy Silane | 10 to 25.0 |
| Water | 65 to 88 |
| Surfactant | 0 to 0.25 |

In accordance with another embodiment, the coating composition may optionally include a solvent, particularly to aid in flowability and wetting ability of the composition. In this embodiment, the aqueous composition comprises, preferably consists essentially of, and more preferably consists of:

| Component | Weight Percent |
| --- | --- |
| Acid | 1.5 to 8.0 |
| Metal Acetate (solids) | 1.5 to 8.0 |
| Organosilane | 10 to 50.0 |
| Water | 35 to 88 |
| Surfactant | 0 to 0.25 |
| Solvent | 3 to 25.0 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Acid | 2.0 to 4.0 |
| Metal Acetate (solids) | 1.75 to 4.0 |
| Organosilane | 10 to 25.0 |
| Water | 55 to 88 |
| Surfactant | 0 to 1 |
| Solvent | 6.0 to 12.0 |

The coating compositions can be applied onto any suitable surface, such metals and composites, in any suitable manner. In at least one embodiment, the coated composition is spray applied over aluminum substrates. Generally, the coating composition is prepared by combining the water with the acid, the metal acetate, the solvent, and optionally with a surfactant and then within 15 to 60 minutes of use, the silane is added to allow for the hydrolysis of the silane to begin. The coating compositions are allowed to air dry at room temperature. Any suitable coating thickness can be employed, however it has been found that coating thicknesses of 0.6 to 2.5 microns have worked particularly well.

Various embodiments of the present invention include working compositions for direct use in coating metals, as well as concentrates, from which such working compositions can be prepared by dilution with water and/or mixing with other chemically distinct concentrates. Various embodiments of the present invention also include processes for treating metals with a composition according to the invention, and may include additional steps that are conventional per se, such as rinsing, conversion coating, and/or painting or some similar overcoating process that puts into place an organic binder containing protective coating over the metal surface treated according to a narrower embodiment of the invention. Articles of manufacture including surfaces treated according to a process of the invention are also within the scope of the invention.

DETAILED DESCRIPTION OF THE PREFERRED EMBODIMENT(S)

Reference will now be made in detail to presently preferred compositions, embodiments and methods of the present invention, which constitute the best modes of practicing the invention presently known to the inventors. However, it is to be understood that the disclosed embodiments are merely exemplary of the invention that may be embodied in various and alternative forms. Therefore, specific details disclosed herein are not to be interpreted as limiting, but merely as a representative basis for any later claim and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Except where otherwise expressly indicated, all weight percents herein are to be understood to be based on percent solids. Practice within the numerical limits stated is generally preferred. Also, unless expressly stated to the contrary: percent, "parts of", and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; specification of materials in ionic form implies the presence of sufficient counterions to produce electrical neutrality for the composition as a whole, and any counterions thus implicitly specified should preferably be selected from among other constituents explicitly specified in ionic form, to the extent possible; otherwise such counterions may be freely selected, except for avoiding counterions that act adversely to the objects of the invention; the term "mole" means "gram mole", "mole" and its variations may be applied herein to ionic or any other chemical species with defined numbers and types of atoms, as well as to chemical substances with well defined conventional molecules; the first definition of an acronym or other abbreviation applies to all subsequent uses herein of the same abbreviation and applies mutatis mutandis to normal grammatical variations of the initially defined abbreviation; and, unless expressly stated to the contrary measurement of a property is determined by the same technique as previously or later referenced for the same property.

In at least one embodiment, the present invention comprises a sol-gel composition comprising acid, metal acetate, organosilane, water and optionally a surfactant. In this embodiment, the sol-gel composition comprises at least, in order of increasing preference 1.75, 1.8, 1.9, 2.0, 2.1, 2.25, 2.5, 2.75, 3.0, or 3.5 weight percent acid and not more than in increasing order of preference about 8.0, 7.5, 7.0, 6.5, 6.0, 5.5, 5.0, 4.5, or 4.0 weight percent acid; at least, in order of increasing preference 1.5, 1.6, 1.7, 1.75, 1.8, 1.9, 2.0, 2.1, 2.25, 2.5, 2.75, 3.0, or 3.5 weight percent metal acetate and not more than in increasing order of preference about 8.0, 7.5, 7.0, 6.5, 6.0, 5.5, 5.0, 4.5, or 4.0 weight percent metal acetate; at least, in order of increasing preference 10, 12, 14, 16, 18, 20, 22, 23, 24, or 25 weight percent organosilane and not more than in increasing order of preference 50, 45, 40, 35, 30, 29, 28, 27, or 26 weight percent organosilane; at least, in order of increasing preference 35, 40, 45, 50, 55, 60, or 65 weight percent water and not more than in increasing order of preference 90, 85, 80, 75, 70, 68, or 66 weight percent water; and 0-1 weight percent surfactant. Generally when optional surfactant is used, it is present in an amount of at least, in order of increasing preference 0.001, 0.01, 0.1, 0.2, or 0.25 weight percent and not more than in increasing order of preference 1, 0.75, 0.50, or 0.30 weight percent. In one embodiment, the sol-gel composition comprises 2-4.0 weight percent acid, 1.75-4.0 weight percent metal acetate, 10-25 weight percent organosilane, 65-88 weight percent water, and 0-0.25 weight percent surfactant.

In at least one embodiment, the pH of the composition is 2.5-5, in other embodiments 3-4, and in yet other embodiments 3.2-3.5.

Any suitable acid can be used. In at least one embodiment, glacial acetic acid is preferred. In other embodiments, fluorozirconic acid, hydrochloric acid, sulfuric acid, nitric acid, phosphoric acid, and combinations thereof could be used either in addition to, or in place of, glacial acetic acid.

Any suitable metal acetate can be used. In at least one embodiment, metal acetates having an oxidation number equal to or greater than 2 have been found to be particularly suitable. In a particularly preferred embodiment, the metal acetate is zirconium acetate or magnesium acetate, however it should be understood that acetates of other metals, such as cobalt, chrome, manganese and lithium, could be used.

Any suitable organosilane can be used. In at least certain embodiments, organosilanes that are hydrolysable at room temperature have been found to be particularly suitable. In at least one embodiment, the organosilane is an epoxy silane or an amine silane.

While any suitable epoxy silane can be used, examples of certain suitable ones include, but are not limited to, glycidoxymethyltrimethoxysilane, 3-glycidoxypropyltrihydroxysilane, 3-glycidoxypropyl-dimethylhydroxysilane, 3-glycidoxypropyltrimethoxysilane, 3-glycidoxypropyl triethoxysilane, 3-glycidoxypropyldimethoxymethylsilane, 3-glycidoxypropyldimethyl-methoxysilane, 3-glycidoxypropyltributoxysilane, 1,3-bis(glycidoxypropyl) tetramethyldisiloxane, 1,3-bis(glycidoxypropyl)tetramethoxydisiloxane, 1,3-bis(glycidoxypropyl)-1,3-dimethyl-1,3-dimethoxydisiloxane, 2,3-epoxypropyl-trimethoxysilane, 3,4-epoxybutyl-trimethoxysilane, 6,7-epoxyheptyl-trimethoxysilane, 9,10-epoxydecyltrimethoxysilane, 1,3-bis(2,3-epoxypropyl) tetramethoxydisiloxane, 1,3-bis(6,7-epoxyheptyl)tetra-methoxydisiloxane, 2-(3,4-epoxycyclohexyl)ethyltrimethoxysilane, and the like.

Any suitable amine silane can be used. Examples of suitable amine silanes include, but are not limited to, 3-aminopropyl trimethoxysilane and 3-aminopropyl triethoxysilane.

It should be understood that other conventional sol-gel components, such as solvents, corrosion inhibitors, defoamers, UV-stabilizers, extenders, plasticizers, and pigments as are known in the art, may be included in the composition.

While any suitable solvent can be used, it has been found in at least certain embodiments that ethylene glycol monobutyl ether is a particularly suitable solvent. Other suitable solvents include those that have found particular utility in water borne coating technologies. Examples of other suitable solvents include, but are not limited to, alcohols, such as methanol and ethanol, glycols, such as dipropylene glycol, and other glycol ethers, such as propylene glycol monobutyl ether and dipropylene glycol monobutyl ether.

In one preferred embodiment, the present invention comprises a sol-gel composition comprising glacial acetic acid, metal acetate, glycidoxypropyl trimethoxy silane, water and optionally a surfactant. In this embodiment, the metal acetate is either zirconium acetate, magnesium acetate, or a combination thereof. In this embodiment, the sol-gel composition comprises 1.75-8.0 weight percent glacial acetic acid, 1.5-8.0 weight percent metal acetate, 10-50 weight percent of an epoxy silane, such as glycidoxypropyl trimethoxy silane, 35-90 weight percent water, and 0-1 weight percent surfactant. In another embodiment, the sol-gel composition comprises 2-4.0 weight percent glacial acetic acid, 1.75-4.0 weight percent metal acetate, 10-25 weight percent of an epoxy silane, 65-88 weight percent water, and 0-0.25 weight percent surfactant.

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Acid | 1.75 to 8.0 |
| Metal Acetate (solids) | 1.5 to 8.0 |
| Organosilane | 10 to 50.0 |
| Water | 35 to 90 |
| Surfactant | 0 to 1 |

In accordance with various other embodiments of the invention is an aqueous composition for coating metal substrates, wherein the aqueous composition comprises, preferably consists essentially of, and more preferably consists of:

| Component | Weight Percent |
| --- | --- |
| Acid | 2.0 to 4.0 |
| Metal Acetate (solids) | 1.75 to 4.0 |

| Component | Weight Percent |
| --- | --- |
| Organosilane | 10 to 25.0 |
| Water | 65 to 88 |
| Surfactant | 0 to 0.25 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Glacial Acetic Acid | 1.75 to 8.0 |
| Zirconium Acetate (solids) | 1.5 to 8.0 |
| Glycidoxypropyl Trimethoxy Silane | 10 to 50.0 |
| Water | 35 to 90 |
| Surfactant | 0 to 1 |

In accordance with various other embodiments of the invention is an aqueous composition for coating metal substrates, wherein the aqueous composition comprises, preferably consists essentially of, and more preferably consists of:

| Component | Weight Percent |
| --- | --- |
| Glacial Acetic Acid | 2.0 to 4.0 |
| Zirconium Acetate (solids) | 1.75 to 4.0 |
| Glycidoxypropyl Trimethoxy Silane | 10 to 25.0 |
| Water | 65 to 88 |
| Surfactant | 0 to 0.25 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Glacial Acetic Acid | 1.75 to 8.0 |
| Magnesium Acetate (solids) | 1.5 to 8.0 |
| Glycidoxypropyl Trimethoxy Silane | 10 to 50.0 |
| Water | 35 to 90 |
| Surfactant | 0 to 1 |

In accordance with various other embodiments of the invention is an aqueous composition for coating metal substrates, wherein the aqueous composition comprises, preferably consists essentially of, and more preferably consists of:

| Component | Weight Percent |
| --- | --- |
| Glacial Acetic Acid | 2.0 to 4.0 |
| Magnesium Acetate (solids) | 1.75 to 4.0 |
| Glycidoxypropyl Trimethoxy Silane | 10 to 25.0 |
| Water | 65 to 88 |
| Surfactant | 0 to 0.25 |

In accordance with another embodiment, the coating composition may optionally provide a solvent, particularly to aid in flowability and wetting ability of the composition. In this embodiment, the aqueous composition comprises, preferably consists essentially of, and more preferably consists of:

| Component | Weight Percent |
| --- | --- |
| Acid | 1.5 to 8.0 |
| Metal Acetate (solids) | 1.5 to 8.0 |
| Organosilane | 10 to 50.0 |
| Water | 35 to 88 |
| Surfactant | 0 to 0.25 |
| Solvent | 0 to 40 |

In accordance with yet another embodiment, the coating composition may optionally provide a solvent, particularly to aid in flowability and wetting ability of the composition. In this embodiment, the aqueous composition comprises, preferably consists essentially of, and more preferably consists of:

| Component | Weight Percent |
| --- | --- |
| Acid | 2.0 to 4.0 |
| Metal Acetate (solids) | 1.75 to 4.0 |
| Organosilane | 10 to 25.0 |
| Water | 55 to 88 |
| Surfactant | 0 to 0.25 |
| Solvent | 5 to 15 |

In accordance with various embodiments of the invention is an aqueous composition for coating metal substrates, such as of aluminum and its alloys, wherein the aqueous composition comprises, preferably consists essentially of, and more preferably consists of:

| Component | Weight Percent |
| --- | --- |
| Glacial Acetic Acid | 2.0 to 4.0 |
| Magnesium Acetate (solids) | 1.75 to 4.0 |
| Glycidoxypropyl Trimethoxy Silane | 10 to 25.0 |
| Water | 55 to 88 |
| Surfactant | 0 to 1 |
| Solvent | 6.0 to 12.0 |

The coating compositions can be applied in any suitable manner onto any suitable metal surface in any suitable manner. In at least one embodiment, the coating composition is spray applied over aluminum substrates. In another embodiment, the coating composition is spray applied over a corrosion resistant coating on a metal substrate. In this embodiment, the coating composition has been found to be particularly effective as a seal for metal oxide corrosion resistant coatings on aluminum alloy substrates. In this embodiment, while any suitable metal oxide can be used, metal oxides of Ti, Zr, Si, Al, Ge and B are preferred, with Ti, Zr, Al and Si being somewhat more preferred, and Ti and Zr being most preferred. The use of the coating composition as a seal for oxide (corrosion resistant) coated alloys has been found to be particularly effective at increasing the corrosion resistance of the underlying substrate, particularly substrates of copper containing aluminum alloys, such as AA2024-T3.

The coating composition can be prepared in any suitable manner. In one embodiment, the coating composition can generally be prepared by combining the water with the acid with the metal acetate and optionally with a surfactant and then within 15 to 60 minutes of use, the silane is added to allow for the hydrolysis of the silane to begin. The coating compositions are allowed to air dry at room temperature. Any suitable coating thickness can be employed, however it has been found that coating thicknesses of 0.6 to 2.5 microns have worked particularly well.

In one particular embodiment, the sol-gel composition is provided as a 2 component (2K) product. The first part (Part A) is comprised of most of the formula, including the acid and the metal acetate. The second part (Part B) comprises the silane and optionally any components which do not negatively affect stability of Part B, e.g., those that do not cause silane hydrolysis. These two parts are kept separate until just before application. Upon mixing, the silane begins hydrolysis and the mixture is applied to the substrate.

In one embodiment, the general formula by weight in grams is:

| Part A | DI Water | 84.2 |
| | Glacial Acetic Acid | 3.25 |
| | Surfactant | 0.05 |
| | Zirconium Acetate (various metal acetates can be used here such as Zr or Mg. | 12.5 |
| Part B | Glycidoxypropyl Trimethoxy Silane | 20 |

The following is an exemplary process for making Part A:
1. Add the water to a clean vessel and start agitator
2. Add glacial acetic acid and mix for 5 minutes
3. Add surfactant and mix for 5 minutes
4. Add zirconium acetate and mix for 15 minutes The order of addition is not critical in this product. However, in one embodiment, it is preferred that the acid is added to the water rather than the other way around.

In the case of magnesium acetate, it should be added to water so it will dissolve (it is a solid raw material).

Part B can be added into Part A and mixed. Once the product is mixed, it should be allowed a 30 minute induction time, remixed, and then used.

Below are particularly preferred embodiments of sol-gel formulas normalized to 100 grams total formula weight or metal portion.

| | Weight (g) | Weight % |
|---|---|---|
| Zirconium Based | | |
| Part A | | |
| DI Water | 84.2 | 70.17 |
| Glacial Acetic Acid | 3.25 | 2.71 |
| Surfactant | 0.05 | 0.04 |
| Zirconium Acetate (about 25% solids in water-based solution) | 12.5 | 10.42 |
| Part B | | |
| Glycidoxypropyl Trimethoxy Silane | 20 | 16.67 |
| Total | 120 | 100 |
| Magnesium Based | | |
| Part A | | |
| DI Water | 94.47 | 78.73 |
| Glacial Acetic Acid | 3.25 | 2.71 |
| Surfactant | 0.05 | 0.04 |
| Magnesium Acetate | 2.23 | 1.86 |
| Part B | | |
| Glycidoxypropyl Trimethoxy Silane | 20 | 16.67 |
| Total | 120 | 100 |

In at least another embodiment, a suitable composition comprises:

| Component | Wt. % |
|---|---|
| DI Water | 37.26-84.91 |
| Glacial Acetic Acid | 1.91-7.98 |
| Surfactant | 0.00-0.04 |
| Metal Acetate (solids) | 1.84-7.68 |
| Glycidoxypropyl Trimethoxy Silane | 11.29-47.05 |

The practice of the present invention may be further appreciated by consideration of the following, non-limiting, working examples.

EXAMPLES

Example 1

One sample of a sol-gel was made of the following components in the following amount:

| Component | Wt.(grams) |
|---|---|
| DI Water | 152.564 |
| Zirconium Acetate hydroxide solution (25% Solution) | 37.59 |
| Glacial Acetic Acid | 9.75 |
| Surfactant | 0.096 |
| Total - Part 1 | 200.000 |
| Glycidoxypropyl Trimethoxy Silane - Part 2 | 57.54 |
| Total | 257.54 |

A panel was prepared by cleaning AA2024-T3 panels with Turco 6849 (20% concentration, at 130° F., for 10 minutes), and deoxidizing with Deoxalume 2310 (15% concentration, room temp. for 5 minutes). The sample was made approximately 30 minutes prior to use, to keep the 'induction time' equal, and to allow for the hydrolysis of the silanes to begin. After 30 minutes, the coating was applied with a spray bottle onto the panel and allowed to air dry in ambient conditions (about 73° F.) for 7 days.

After the 7 days, the sample was subjected to 168 hours ASTM B117 salt spray and rated on total percentage of corrosion. The sample had good corrosion protection.

Example 2

Various magnesium acetate levels between 2.5 and 10 grams per approximately 220 grams of total sol-gel were tested as shown below:

| | (wt. in grams) | | | |
|---|---|---|---|---|
| Components | A | B | C | D |
| DI Water | 168.4 | 168.4 | 168.4 | 168.4 |
| Magnesium Acetate (solids) | 2.5 | 4 | 5 | 6 |
| Glacial Acetic Acid | 6.5 | 6.5 | 6.5 | 6.5 |
| 10% Surfactant | 1 | 1 | 1 | 1 |
| Glycidoxypropyl Trimethoxy Silane | 38.36 | 38.36 | 38.36 | 38.36 |

The table below recites weight percents of the components from the immediately preceding table:

| | Wt. % | | | |
|---|---|---|---|---|
| Component | A | B | C | D |
| DI Water | 77.69 | 77.16 | 76.80 | 76.46 |
| Magnesium Acetate (solids) | 1.15 | 1.83 | 2.28 | 2.72 |
| Glacial Acetic Acid | 3.00 | 2.98 | 2.96 | 2.95 |
| 10% Surfactant | 0.46 | 0.46 | 0.46 | 0.45 |
| Glycidoxypropyl Trimethoxy Silane | 17.70 | 17.58 | 17.49 | 17.42 |
| Total | 100.00 | 100.00 | 100.00 | 100.00 |

The below results indicate that the samples look good for both air dry and for baked anti-corrosive properties:

| | Air Dry, 72 hr SS Results | | 230 F. 30 minute, 168 hr SS Results | |
|---|---|---|---|---|
| Sample | Panel 1 | Panel 2 | Panel 1 | Panel 2 |
| A | 75 pits | 75 pits | 10 pits | 10 pits |
| B | 75 pits | 75 pits | 25 pits | 15 pits |
| C | 100 pits | 100 pits | 25 pits | 25 pits |
| D | 200 pits | 200 pits | 100 pits | 100 pits |

Example 3

Metal oxide coatings, such as titanium oxide and zirconium oxide, are good corrosion resistant coatings on most aluminum alloys. However AA2024-T3, due to the high copper content, is more of a challenge. It has been found, as will be shown by the following example, that sealing metal oxide coated AA2024-T3 substrate with a sol-gel product allows the total process to surpass the corrosion requirements needed for AA2024-T3 applications. Sealing with sol-gels based on this technology can offer a significant improvement over other types of sealing techniques.

Metal oxide coated panels were prepared on AA2024-T3 panels (8 inches by 3 inches). The panels were coated with 4 variations of a sol-gel formulation, mainly varied by concentration.

The formula variations can be seen in the table below

| | Wt. (g) | | | |
|---|---|---|---|---|
| Component | A - Control | B - 2X | C - 5X | D - 15X |
| Glacial Acetic Acid | 0.65 | 1.3 | 3.25 | 9.75 |
| DI Water | 196.748 | 193.592 | 184.124 | 152.564 |
| Surfactant | 0.096 | 0.096 | 0.096 | 0.096 |
| Zirconium acetate hydroxide solution | 2.506 | 5.012 | 12.53 | 37.59 |
| Total - Part 1 | 200 | 200 | 200 | 200 |
| Total - Part 2 | 3.836 | 7.672 | 19.18 | 57.54 |

Each of these coatings were applied over the metal oxide on AA2024-T3. Then some samples were allowed to air dry and then cured in an oven at 100° C. for 30 minutes (baked), and some were placed directly into the oven (baked) after sol-gel application. The panels are identified as follows:
   A—Composition A applied over metal oxide and air dried vertically prior to bake;
   B—Composition B applied over metal oxide and air dried vertically prior to bake;
   C—Composition C applied over metal oxide and air dried vertically prior to bake;
   D—Composition D applied over metal oxide and air dried vertically prior to bake;
   E—no sol-gel coating applied. This is a control metal oxide panel over AA2024-T3;
   F—Composition D applied over metal oxide and air dried horizontally prior to bake;
   G—Composition A applied over metal oxide and directly placed in the vertically oven to bake;
   H—Composition B applied over metal oxide and directly placed in the oven vertically to bake;
   I—Composition C applied over metal oxide and directly placed in the oven vertically to bake;
   J—Composition D applied over metal oxide and directly placed in the oven vertically to bake.

After the sol-gels were applied, the panels were subjected to 500 hours in a salt spray chamber according to ASTM B117. Panels were not rated for corrosion pits, as pits are not usually as evident on the surface of metal oxide coatings as they are aluminum. Results were recorded for corrosion (or discoloration) and a qualitative evaluation of the degree of corrosion was made. The results are observed as follows:
   A—General corrosion over the entire panel, not localized to one area;
   B—Corrosion mainly at the bottom of the panel, or the area of the panel that had a slightly thinner sol-gel coating due to coating flow while hung vertically;
   C—No corrosion at all on the panel;
   D—No corrosion at all on the panel;
   E—Corrosion over the entire panel;
   F—No corrosion at all on the panel;
   G—General corrosion over the entire panel, not localized to one area;
   H—Corrosion mainly at the bottom of the panel, or the area of the panel that had a slightly thinner sol-gel coating due to coating flow while hung vertically;
   I—No corrosion at all on the panel; and
   J—No corrosion at all on the panel.

Sol-gel samples C and D appeared to provide a good seal over metal oxide coated AA2024-T3 panels regardless if the panels were air-dried vertically or horizontally and regardless if they were air dried or went directly into the bake over after sol-gel application.

The sol-gel coated panels provided corrosion protection to at least 500 hours salt spray hours. This is in excess of salt spray performance of metal oxide alone without a sol-gel seal on such substrates.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for improving corrosion resistance of a metallic substrate, the method comprising steps of:
    providing an aqueous organo sol-gel composition consisting essentially of components of:
        acid in an amount such that the pH of the aqueous organo sol-gel composition is from 2.5 to 5;
        metal acetate selected from the group consisting of zirconium acetate, magnesium acetate, and a combination thereof;
        organosilane; and
        water;
    with the proviso that all zirconium and magnesium present in the aqueous organo sol-gel composition is from said metal acetate; wherein the acid comprises glacial acetic acid; the organosilane comprises glycidoxypropyl trimethoxy silane and the metal acetate comprises zirconium acetate;
    depositing the composition on an aluminum or aluminum alloy substrate; and
    allowing the composition to dry at temperatures less than 100° Celsius to form a sol-gel coating on the substrate, wherein the coated metallic substrate shows no corrosion after at least 500 hours salt spray testing according to ASTM B117.

2. The method of claim 1, wherein the coating composition is sprayed against a metal substrate to form a coating 0.6 to 2.5 microns thick on the substrate.

3. The method of claim 1, wherein the substrate comprises aluminum and has a metallic oxide coating thereon, the sol-gel coating being disposed on the metallic oxide coating to form a seal over the metallic oxide coating.

4. The method of claim 3 wherein the substrate further comprises copper.

5. The method of claim 3 wherein the metal oxide coating is selected from the group consisting of zirconium oxide, titanium oxide and combinations thereof.

6. The method of claim 3 wherein the metal oxide comprises titanium oxide.

7. The method of claim 1 wherein the composition is allowed to dry to form a sol-gel coating on the substrate at ambient temperature.

8. The method of claim 1, wherein the aqueous organo sol-gel composition is provided as a two component product comprising:
    A) a first part comprised of the acid and the metal acetate; and
    B) a second part that comprises the organosilane and optional components that do not cause silane hydrolysis;
    said method further comprising an induction step wherein, prior to depositing, said first part and second part are mixed thereby forming a mixture, the mixture is allowed an induction time during which the organosilane begins hydrolysis and the mixture is remixed.

9. The method of claim 1, wherein the components are present in weight percents measured of:
    acid: 1.75 to 8;
    metal acetate: 1.5 to 8 as solids;
    organosilane: 10 to 50;
    water: 35 to 85; and
    surfactant: 0 to 1.

10. The method of claim 1, wherein the components are present in weight percents measured of:
    acid: 2 to 4;
    metal acetate: 1.75 to 4 as solids;
    organosilane: 10 to 25;
    water: 55 to 80;
    surfactant: 0 to 1; and
    a solvent, different from water: 6 to 12.

11. The method of claim 1 wherein the acid is present in an amount such that the pH of the aqueous organo sol-gel composition is from 3 to 4.

12. The method of claim 1 wherein the acid is present in an amount such that the pH of the aqueous organo sol-gel composition is from 3.2 to 3.5.

13. A method for improving corrosion resistance of a metallic substrate, the method comprising steps of:
    providing an aqueous organo sol-gel composition consisting essentially of:
        acid in an amount such that the pH of the aqueous organo sol-gel composition is from 2.5 to 5;
        metal acetate selected from the group consisting of zirconium acetate, magnesium acetate, and a combination thereof;
        organosilane;
        optionally surfactant;
        a solvent, different from water, in an amount of 6 to 25 weight %, based on the total weight of the components in the composition; and
        water
    wherein said metal acetate provides all zirconium and magnesium present in the aqueous organo sol-gel composition; and wherein the metal acetate is zirconium acetate or a combination of zirconium acetate and magnesium acetate;
    depositing the composition on an aluminum or aluminum alloy substrate; and
    allowing the composition to dry at temperatures less than 100° Celsius to form a sol-gel coating on the substrate.

14. The method of claim 13, wherein the solvent is present in an amount 5 to 15 weight %, based on the total weight of the components in the composition.

15. The method of claim 13, wherein the solvent is present in an amount 6 to 12 weight %, based on the total weight of the components in the composition.

16. The method of claim 13, wherein the coating composition is applied against a metal substrate to form a coating 0.6 to 2.5 microns thick on the substrate.

17. The method of claim 13, wherein the solvent is a glycol ether.

18. A method for improving corrosion resistance of a metallic substrate, the method comprising steps of:
    providing an aqueous organo sol-gel composition consisting essentially of components of:
        acid in an amount such that the pH of the aqueous organo sol-gel composition is from 2.5 to 5;
        metal acetate selected from the group consisting of zirconium acetate, magnesium acetate, and a combination thereof;
        organosilane; and
        water;
    with the proviso that all zirconium and magnesium present in the aqueous organo sol-gel composition is from said metal acetate;
    depositing the composition on an aluminum or aluminum alloy substrate, wherein the substrate comprises aluminum and has a metallic oxide coating thereon, the sol-gel coating being disposed on the metallic oxide coating to form a seal over the metallic oxide coating; and allowing the composition to dry at temperatures less than 100° Celsius to form a sol-gel coating on the substrate;

wherein the coated metallic substrate shows no corrosion after at least 500 hours salt spray testing according to ASTM B117.

19. The method of claim 18 wherein the substrate further comprises copper.

20. The method of claim 18 wherein the metal oxide coating is selected from the group consisting of zirconium oxide, titanium oxide and combinations thereof.

21. The method of claim 18 wherein the metal oxide comprises titanium oxide.

* * * * *